US011227409B1

(12) United States Patent
Wu et al.

(10) Patent No.: US 11,227,409 B1
(45) Date of Patent: Jan. 18, 2022

(54) CAMERA ASSESSMENT TECHNIQUES FOR AUTONOMOUS VEHICLES

(71) Applicant: Waymo LLC, Mountain View, CA (US)

(72) Inventors: Chen Wu, Cupertino, CA (US); Carl Warren Craddock, San Francisco, CA (US); Andreas Wendel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 121 days.

(21) Appl. No.: 16/105,084

(22) Filed: Aug. 20, 2018

(51) Int. Cl.
| | |
|---|---|
| *G06T 7/80* | (2017.01) |
| *G06K 9/00* | (2006.01) |
| *G06K 9/62* | (2006.01) |
| *G01S 17/86* | (2020.01) |
| *G01S 17/931* | (2020.01) |

(52) U.S. Cl.
CPC ............... *G06T 7/80* (2017.01); *G01S 17/86* (2020.01); *G01S 17/931* (2020.01); *G06K 9/00825* (2013.01); *G06K 9/6288* (2013.01)

(58) Field of Classification Search
CPC ......... G06T 7/80; G01S 17/931; G01S 17/86; G06K 9/00825; G06K 9/6288
See application file for complete search history.

(56) References Cited

U.S. PATENT DOCUMENTS

| | | | |
|---|---|---|---|
| 5,214,408 A | 5/1993 | Asayama | |
| 5,825,464 A | 10/1998 | Feichtner | |
| 7,676,110 B2 | 3/2010 | Steinberg et al. | |
| 7,813,888 B2 | 10/2010 | Vian et al. | |
| 7,991,550 B2 | 8/2011 | Zeng | |
| 8,195,358 B2 | 6/2012 | Anderson | |
| 8,229,618 B2 | 7/2012 | Tolstedt et al. | |
| 8,521,352 B1 | 8/2013 | Ferguson et al. | |
| 8,560,165 B2 | 10/2013 | Salman et al. | |
| 8,630,806 B1 | 1/2014 | Zhu | |
| 9,221,396 B1 | 12/2015 | Zhu et al. | |
| 9,251,598 B2 | 2/2016 | Wells et al. | |
| 9,310,210 B2 | 4/2016 | Stahlin et al. | |

(Continued)

FOREIGN PATENT DOCUMENTS

| | | |
|---|---|---|
| DE | 4100501 A1 | 7/1992 |
| JP | 6-195121 | 7/1994 |

OTHER PUBLICATIONS https://en.wikipedia.org/wiki/Color_difference#CIE76, downloaded Jul. 2018 (7 pgs.).

(Continued)

*Primary Examiner* — Leon Viet Q Nguyen
(74) *Attorney, Agent, or Firm* — Botos Churchill IP Law

(57) ABSTRACT

The disclosure relates to assessing operation of a camera. In one instance, a volume of space corresponding to a first vehicle in an environment of a second vehicle may be identified using sensor data generated by a LIDAR system of the second vehicle. An image captured by a camera of the second vehicle may be identified. The camera may have an overlapping field of view of the LIDAR system at a time when the sensor data was generated. An area of the image corresponding to the volume of space may be identified and processed in order to identify a vehicle light. The operation of the camera may be assessed based on the processing.

15 Claims, 14 Drawing Sheets

(56) References Cited

U.S. PATENT DOCUMENTS

| | | | |
|---|---|---|---|
| 9,436,880 B2* | 9/2016 | Bos | H04N 13/239 |
| 9,900,522 B2 | 2/2018 | Lu | |
| 2004/0167717 A1 | 8/2004 | Buchanan et al. | |
| 2005/0192727 A1 | 9/2005 | Shostak et al. | |
| 2005/0240328 A1 | 10/2005 | Shirato et al. | |
| 2006/0208169 A1 | 9/2006 | Breed et al. | |
| 2007/0286497 A1 | 12/2007 | Podilchuk | |
| 2007/0291130 A1* | 12/2007 | Broggi | G01S 17/931 348/218.1 |
| 2008/0012938 A1 | 1/2008 | Kubota et al. | |
| 2008/0162027 A1 | 7/2008 | Murphy et al. | |
| 2009/0021581 A1* | 1/2009 | Sun | G06K 9/2054 348/148 |
| 2009/0030569 A1 | 1/2009 | Thorne | |
| 2009/0059084 A1 | 3/2009 | Okada et al. | |
| 2009/0115610 A1 | 5/2009 | Steinhage et al. | |
| 2009/0177347 A1 | 7/2009 | Breuer et al. | |
| 2010/0094499 A1 | 4/2010 | Anderson | |
| 2010/0104199 A1 | 4/2010 | Zhang et al. | |
| 2010/0169013 A1 | 7/2010 | Nakamura et al. | |
| 2010/0312461 A1 | 12/2010 | Haynie et al. | |
| 2011/0035123 A1 | 2/2011 | Katrak et al. | |
| 2011/0075518 A1 | 3/2011 | Huhta et al. | |
| 2011/0115615 A1 | 5/2011 | Luo et al. | |
| 2011/0118967 A1 | 5/2011 | Tsuda | |
| 2011/0130916 A1 | 6/2011 | Mayer | |
| 2011/0166746 A1 | 7/2011 | Breuer et al. | |
| 2012/0136510 A1 | 5/2012 | Min et al. | |
| 2012/0206575 A1 | 8/2012 | Massanell et al. | |
| 2012/0269387 A1 | 10/2012 | Becker et al. | |
| 2012/0308114 A1 | 12/2012 | Othmezouri et al. | |
| 2013/0030756 A1 | 1/2013 | Bielski et al. | |
| 2013/0058527 A1 | 3/2013 | Peynot | |
| 2013/0083201 A1 | 4/2013 | Takacs | |
| 2013/0177237 A1 | 7/2013 | Schamp | |
| 2013/0184929 A1 | 7/2013 | Salman et al. | |
| 2013/0208121 A1 | 8/2013 | Wu et al. | |
| 2013/0218398 A1 | 8/2013 | Gandhi et al. | |
| 2013/0245877 A1 | 9/2013 | Ferguson et al. | |
| 2013/0300872 A1 | 11/2013 | Park | |
| 2013/0321629 A1 | 12/2013 | Zhang et al. | |
| 2013/0335553 A1 | 12/2013 | Heger et al. | |
| 2015/0049345 A1 | 2/2015 | Miyagawa | |
| 2015/0284009 A1 | 10/2015 | Cullinane et al. | |
| 2016/0057332 A1 | 2/2016 | Ciurea et al. | |
| 2016/0104289 A1* | 4/2016 | Chang | G05D 1/0274 382/154 |
| 2016/0105679 A1* | 4/2016 | Murao | H04N 5/23293 348/169 |
| 2016/0159281 A1 | 6/2016 | Jang et al. | |
| 2016/0210533 A1* | 7/2016 | Kiapour | G06K 9/3216 |
| 2016/0248987 A1 | 8/2016 | Zilly et al. | |
| 2016/0379066 A1 | 12/2016 | Reiche et al. | |
| 2016/0379085 A1 | 12/2016 | Dodballapur et al. | |
| 2018/0027224 A1 | 1/2018 | Javidnia et al. | |
| 2018/0048801 A1* | 2/2018 | Kiser | H04N 5/23238 |
| 2018/0101740 A1 | 4/2018 | Xie et al. | |
| 2018/0137628 A1 | 5/2018 | Shoda et al. | |
| 2018/0139368 A1 | 5/2018 | Nakayama | |
| 2018/0144202 A1* | 5/2018 | Moosaei | G06T 7/90 |
| 2018/0156913 A1 | 6/2018 | Baba | |
| 2018/0188059 A1 | 7/2018 | Wheeler et al. | |
| 2019/0052792 A1 | 2/2019 | Baba et al. | |
| 2019/0129444 A1 | 5/2019 | Wirth et al. | |
| 2019/0132572 A1 | 5/2019 | Shen et al. | |
| 2019/0243376 A1 | 8/2019 | Davis et al. | |
| 2019/0256054 A1 | 8/2019 | Turner et al. | |
| 2019/0281202 A1* | 9/2019 | Chen | G03B 11/00 |
| 2019/0295282 A1 | 9/2019 | Smolyanskiy et al. | |
| 2019/0370574 A1* | 12/2019 | Wang | G06N 3/08 |
| 2020/0005489 A1 | 1/2020 | Kroeger | |
| 2020/0065622 A1 | 2/2020 | Korosi-Szabo et al. | |

OTHER PUBLICATIONS

International Search Report and Written Opinion for Application No. PCTUS2019/047029 dated Dec. 6, 2019.

* cited by examiner

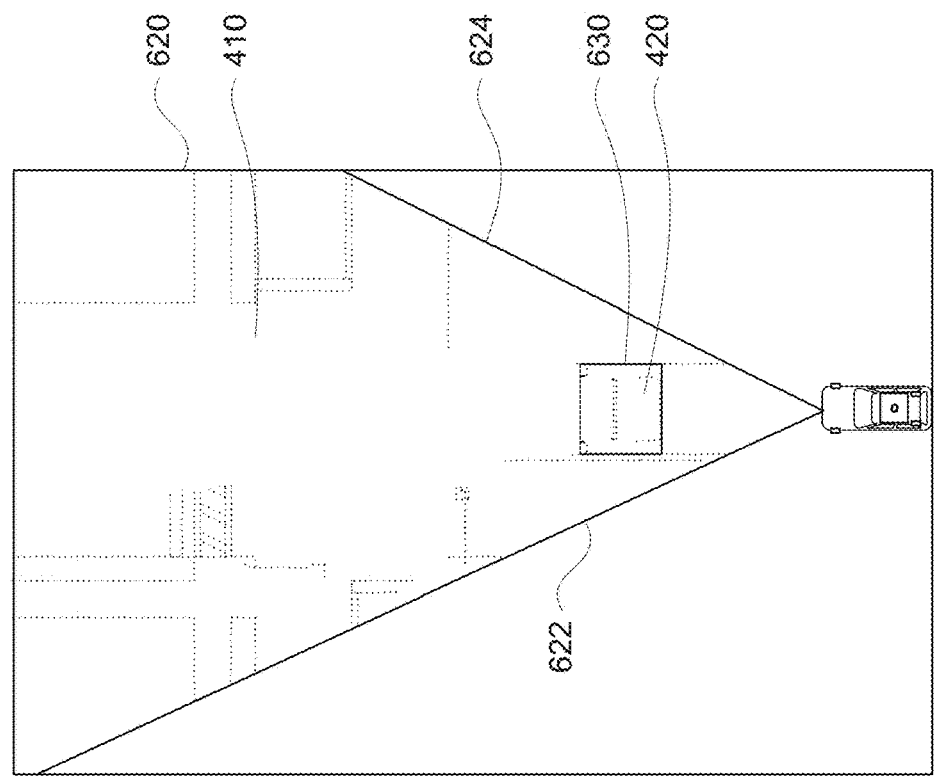
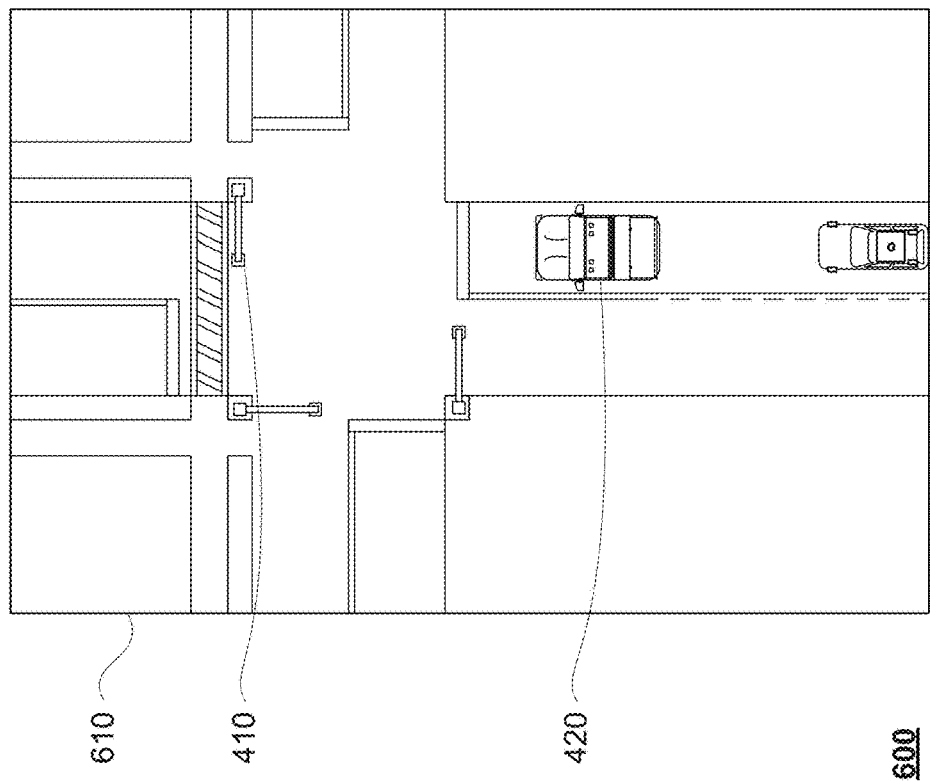
FIGURE 6

1300

CAMERA ASSESSMENT TECHNIQUES FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc. As an example, these systems may include sensors, such as laser scanning equipment and cameras, mounted at various locations on the vehicle. Accordingly, being able to assess the operation of such sensors in real time is critical to ensuring that the vehicle is not relying on sensor data from a non-functioning or debris-covered sensor when making driving decisions.

BRIEF SUMMARY

One aspect of the disclosure provides a method for assessing operation of a camera. The method includes identifying, by one or more processors, a volume of space corresponding to a first vehicle in an environment of a second vehicle using sensor data generated by a light detection and ranging (LIDAR) system of the second vehicle; identifying, by the one or more processors, an image captured by a camera of the second vehicle, the camera having an overlapping field of view of the LIDAR system at a time when the sensor data was generated; identifying, by the one or more processors, an area of the image corresponding to the volume of space; processing, by the one or more processors, the area in order to identify a vehicle light; and assessing, by the one or more processors, the operation of the camera based on the processing.

In one example, the volume of space is a three-dimensional (3D) bounding box, and the area is a two-dimensional (2D) polygon. In this example, identifying the area further comprises projecting the 3D bounding box into the image in order to identify the polygon. In addition or alternatively, the polygon is not a rectangle. In another example, the method also includes capturing the image using the camera, and wherein the camera includes a neutral density (ND) filter. In another example, the vehicle light includes a vehicle tail light. In another example, processing the area includes using an image classifier in order to identify one or more areas of local maximum brightness above a brightness threshold. In another example, processing the area includes identifying contrast areas indicative of bright objects in the area. In another example, identifying the image is further based on ambient lighting conditions when the sensor data was generated. In another example, identifying the image is further based on a time of day when the sensor data was generated. In another example, processing the area includes processing one or more sub-areas within the area based on a model of a vehicle indicating expected areas of vehicle lights. In this example, the method also includes selecting the model from a plurality of models based on a type of the vehicle. In another example, the method also includes, based on the assessment, attempting to clean a lens of the camera. In another example, the method also includes reducing a size of the image before identifying the area.

Another aspect of the disclosure provides a method for assessing operation of a camera. The method includes identifying, by one or more processors, a volume of space corresponding to a road user in an environment of a second vehicle using sensor data generated by a LIDAR system of the second vehicle; identifying, by the one or more processors, an image captured by a camera of the second vehicle, the camera having an overlapping field of view of the LIDAR system at a time when the sensor data was generated; identifying, by the one or more processors, an area of the image corresponding to the volume of space; using, by the one or more processors, the area to determine whether there is an edge in color in the image at the road user; and assessing, by the one or more processors, the operation of the camera based on the determination.

In one example, using the area includes determining an amount of contrast between pixels on different sides of an edge of the area. In another example, the volume of space is a 3D bounding box, and the area is a 2D polygon. In this example, identifying the area further comprises projecting the 3D bounding box into the image in order to identify the polygon. In addition, the method also includes projecting a 3D bounding box of a second road user into the image to identify a second polygon, and wherein the edge in color corresponds to an edge of the polygon that is adjacent to the second polygon. In another example, the method also includes reducing a size of the image before identifying the area.

BRIEF DESCRIPTION OF THE DRAWINGS

FIG. 6 is another example image in accordance with aspects of the disclosure.

DETAILED DESCRIPTION

Overview

Figure 1:
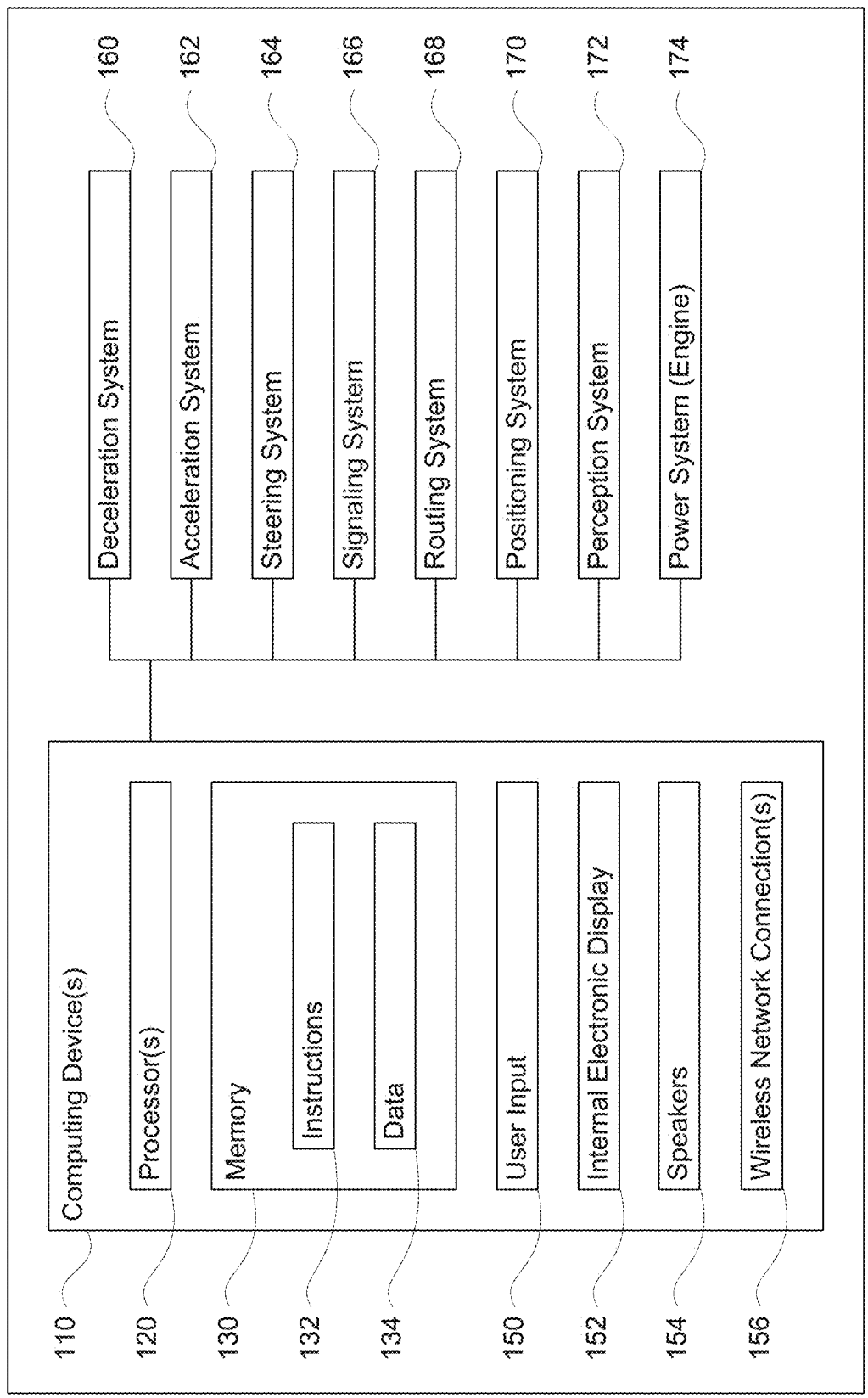
FIG. 1 is a functional diagram of an example vehicle in accordance with aspects of the disclosure according to aspects of the disclosure.

This technology relates to assessing the operation or functionality of a camera rather, confirming that the camera is functioning properly. For instance, it can be difficult to know whether the camera is "seeing" the world properly or if there is some foreign object debris on a lens, condensation, non-functioning pixels, etc. This can be especially important in the case of autonomous vehicles which rely upon such cameras to make driving decisions.

For instance, an autonomous vehicle's perception system may include a plurality of cameras, LIDAR systems, and other sensors. The cameras may have different configurations, for instance, different filters, etc., and may be configured to capture images periodically. At least some of these cameras, and therefore some of the captured images, may have overlapping fields of view with one or more of the LIDAR systems. The functionality of a camera may be validated using sensor data captured by the LIDAR system.

The perception system may detect and identify objects given the sensor data generated by the LIDAR systems. For instance, the LIDAR sensor data for a road user, such as a vehicle, pedestrian or bicyclist may be a arranged within three dimensional (3D) bounding box, that is a three-dimensional volume.

For light emitting road users such as vehicles observed by the perception system during evening hours or where the amount of ambient light is low, each time or every so often that a vehicle is identified by the perception system, a camera having an overlapping field of view with the location of that vehicle at the same time as when the LIDAR sensor data was generated may be selected. If an image was captured using the identified camera at the same or similar time, that image may be used to assess the operation of the camera. In order to do so, the 3D bounding box may be projected into the image. The result may be a two-dimensional (2D) polygon which provides an approximate outline of the vehicle in the image.

The area of the image within the polygon may then be processed in order to identify vehicle lights. The processing may be effected using a classifier that identifies areas of local maximum brightness above some brightness threshold. If one or more vehicle lights are identified within a polygon of an image, the camera may be determined to be functioning normally. In addition, if there are a plurality of polygons, such of two or more or less, in a plurality of images, such as 2 or more or less, in which no vehicle lights are identified, this may be an indication that camera is not functioning properly. As such, an appropriate response may be taken.

During daylight hours, other techniques may be used to assess operation of the camera. As one instance, the vehicle's perception system may capture an image including two or more objects. When these objects are at least partially in line with the camera at different depths will have a color edge between them. In other words, typically an edge in depth will also have an edge in color. The 3D bounding boxes for these objects may be projected into the image. The result may be two or more two-dimensional (2D) polygons which provide an approximate outline of the objects in the image. Because the objects appear to at least partially overlap in the image, at least one of the intersections of these polygons may represent a difference in depth. The areas of the intersections may be processed to determine whether there is a difference in color.

A threshold may then be compared to the difference in color in order to assess the operation of the camera. For instance, if the threshold is met, this may be an indication that the camera is functioning normally. However, if there are a plurality of polygons, such of two or more or less, in a plurality of images, in which no color differences are identified (i.e. the threshold is not met), this may be an indication that camera is not functioning properly. As such, an appropriate response may be taken.

The features described herein allow for reliable camera assessment during various lighting conditions. As noted above, it is incredibly challenging to determine whether a camera is "seeing" the world properly or if it is malfunctioning. This can be especially important in the case of autonomous vehicles which rely upon such cameras to make driving decisions, and also to alert remote assistance when there might be problem, to decide how and when to operate cleaning systems, and to detect when the cleaning system was insufficient.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle in order to maneuver vehicle 100 in a fully autonomous driving mode and/or semi-autonomous driving mode. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (for instance, a gasoline or diesel powered motor or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects in the external environment of the vehicle and generate sensor data describing characteristics of such objects such as location, orientation, size, shape, type, direction and speed of movement, etc. The raw sensor data from the sensors and/or the aforementioned characteristics can be quantified or arranged into a descriptive function or vector and sent for further processing to the computing devices 110. As discussed in further detail below, computing devices 110 may use the positioning system 170 to determine the vehicle's location and perception system 172 to detect and respond to objects when needed to reach the location safely.

Figure 2:
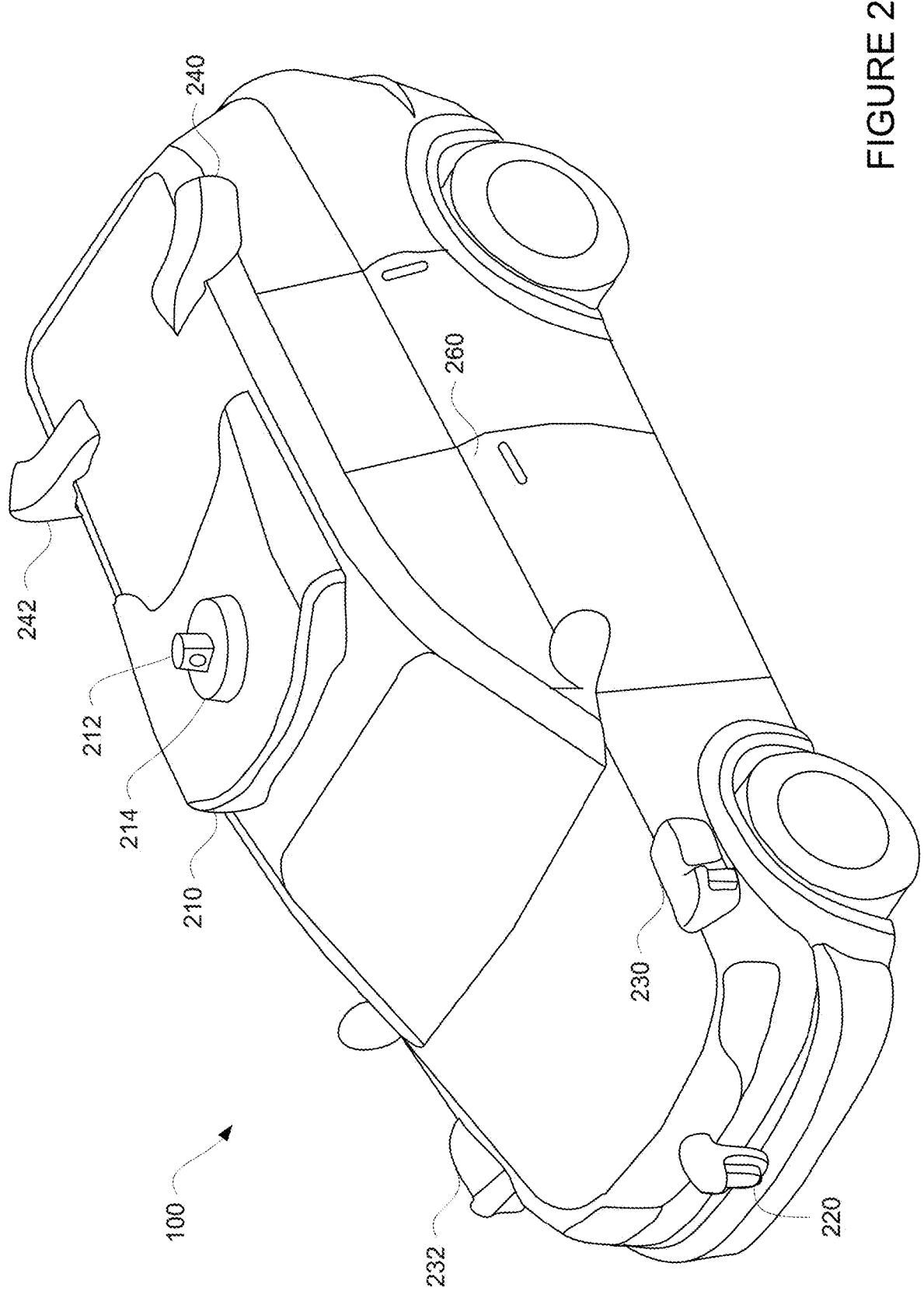
FIG. 2 is an example external view of the example vehicle of FIG. 1 in accordance with aspects of the disclosure.

For instance, FIG. 2 is an example external view of vehicle 100. In this example, rooftop housing 210 and housings 212, 214 may include a LIDAR sensor or system as well as various cameras and radar units. In addition, housing 220 located at the front end of vehicle 100 and housings 230, 232 on the driver's and passenger's sides of the vehicle may each store a LIDAR system. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or rooftop housing 210.

Figure 3:
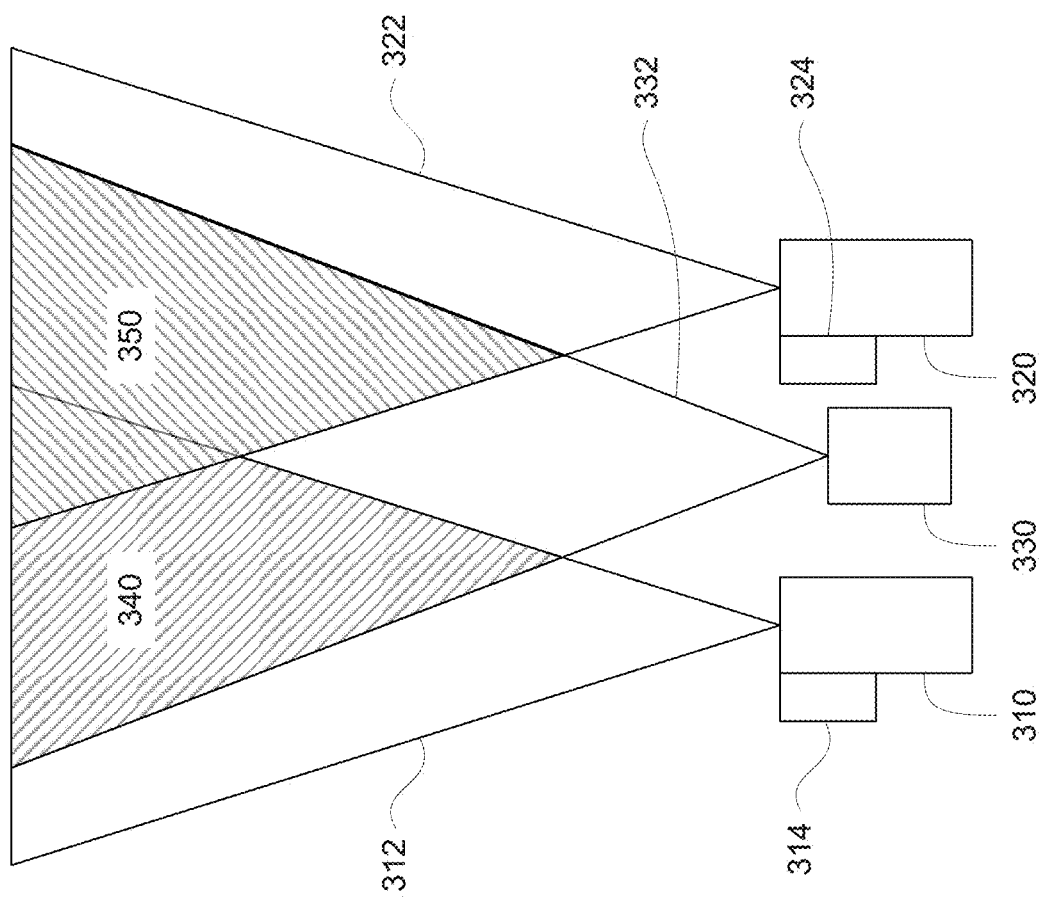
FIG. 3 is an example of cameras and a LIDAR system in accordance with aspects of the disclosure.

The cameras of the perception system 172 may be arranged on the vehicle such that at all or part of the camera field of view overlaps with at least a portion of a field of view of one or more of the LIDAR sensors. For instance, FIG. 3 is an example 300 of a camera 310, a camera 320, and a LIDAR system 330 each having fields of view 312, 322, 332. In this example, a portion 340 of the fields of views 312 and 332 overlap, and a portion 350 of the fields of view 322 and 332 overlap. As such, the sensor data generated by the cameras 310 and/or 320 and LIDAR system 330 may at times capture the same objects in the same positions. In this example, the camera 310 may correspond to any of the cameras of housing 210, 212, 214, 240, or 242 or a camera at some other location on the vehicle 100. Similarly, LIDAR system 330 may correspond to the LIDAR systems of housing 220 or any of housings 210, 212, 214, 230, or 232 or a LIDAR system at some other location on the vehicle 100. In addition, the camera may have a cleaning system 314 that may include a wiper and/or washer fluid in order to clear a lens of the camera. Operation of the cleaning systems may be controlled, for instance, by computing devices 110. The camera may be fixed relative to the vehicle in order to ensure that the overlapping field of view remains consistent.

The cameras of the perception system may capture images using different filtering techniques and/or exposure periods. For instance, one image may be captured using a first camera with an ND filter over a first exposure period and a second image may be captured using a second camera without an ND filter over a second exposure period. The first and second exposure times may be the same or different, for instance, the second exposure period may be shorter than the first exposure period. This vehicle light detection technique may be especially useful with cameras that utilize ND filters and generally longer exposure periods in order to detect fast-blinking (pulse-width modulated) LED lights. The slower shutter speed allows for the averaging of multiple flash cycles into a single captured image.

Figure 4:
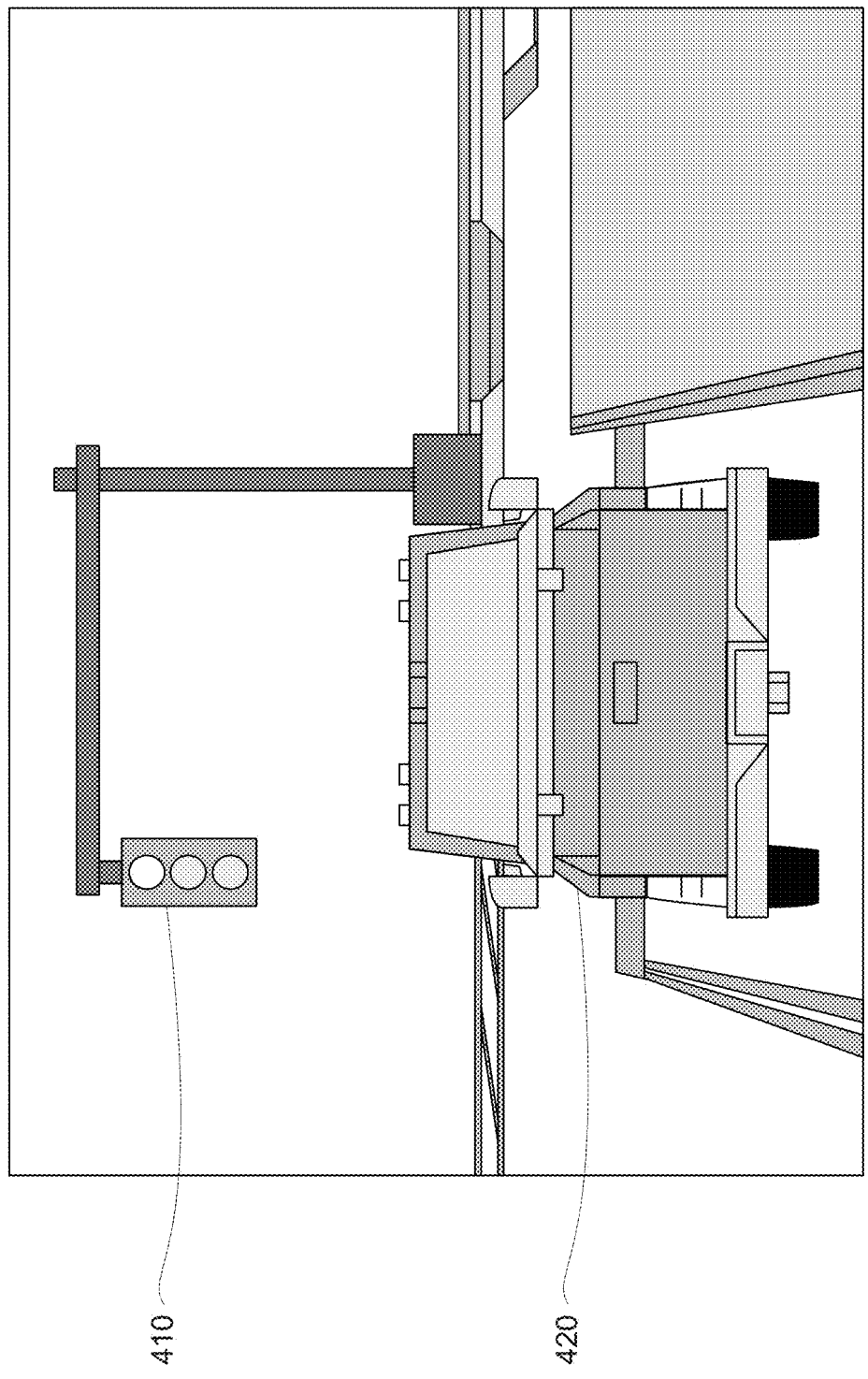
FIG. 4 is an example of a top-down view and sensor data in accordance with aspects of the disclosure.
Figure 5:
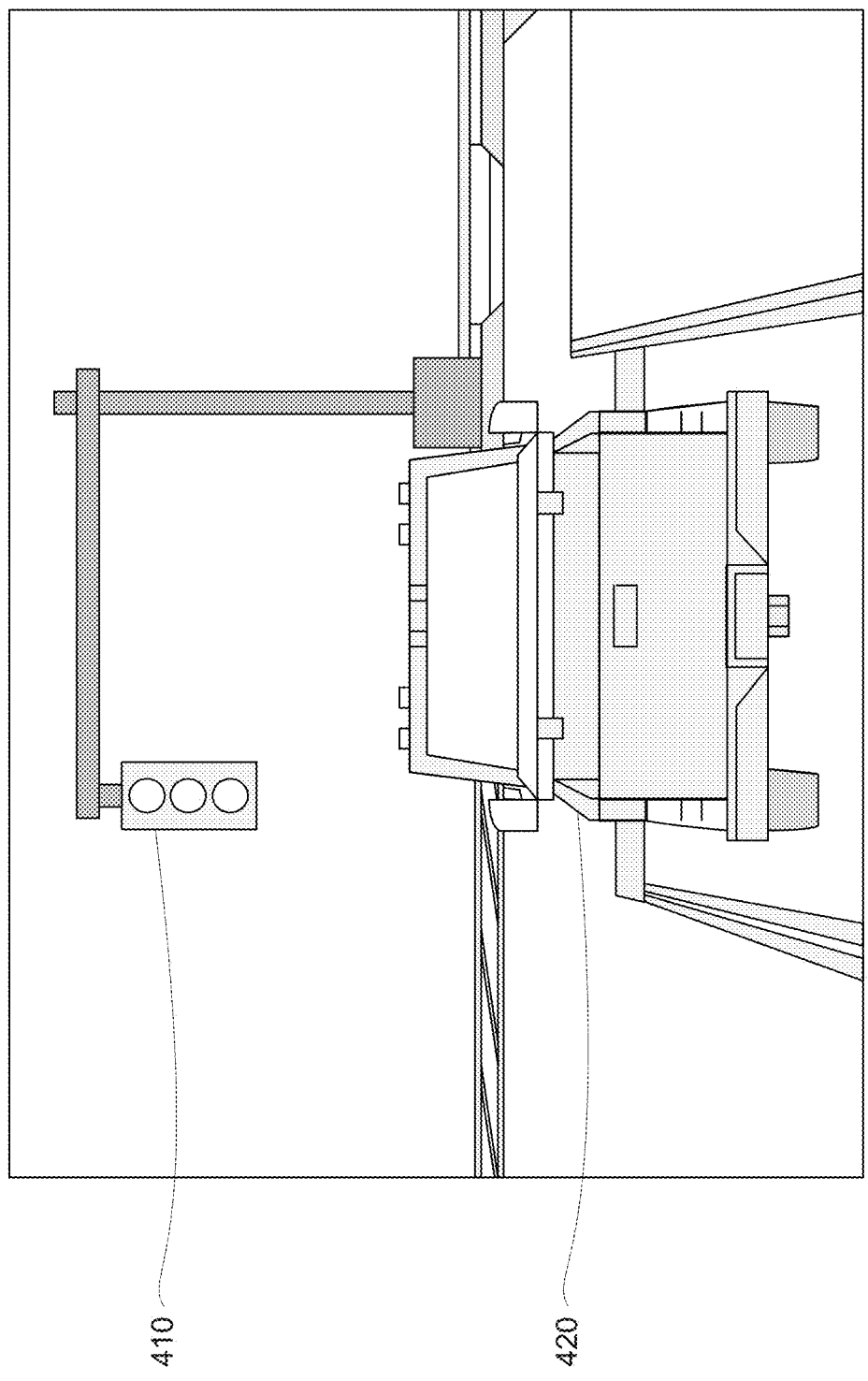
FIG. 5 is an example image in accordance with aspects of the disclosure.

For instance, referring to the images 400 and 500 of FIGS. 4 and 5, one image 400 may be captured using a first camera, such as camera 310, with an ND filter over a first exposure period and a second image 500 may be captured using a second camera, such as camera 320, without an ND filter over a second exposure period. The first and second exposure times may be the same or different, for instance, the second exposure period may be shorter than the first exposure period. As an example, the image 400 may include a traffic light 410 and a vehicle 420 and possibly rough contours of other objects. The image 500 may include the traffic light 410 overexposed and the vehicle 420 overexposed.

In addition, the perception system 172 may detect and identify objects given the sensor data generated by the LIDAR systems. For instance, the LIDAR system may generate points identifying location and intensity information for LIDAR returns or LIDAR sensor data. Groups of points may be fitted to a three dimensional (3D) bounding box, that is a three-dimensional volume, such as a 3D rectangle or other 3D volume or contour, in which the points for the road user may be located. From this, characteristics of the object, such as its location, shape, speed, orientation, heading, and type may be determined, for instance, using a machine learning classifier or other techniques. By grouping and classifying these points, the perception system may detect and identify other road users such as vehicles (cars, motorcycles, trucks, busses, etc.), pedestrians and bicyclists.

FIG. 6 is an example 600 of a top-down view 610 and sensor data 620 generated by a LIDAR system of perception system 172 corresponding to the scenario presented in images 400 and 500. In this example, the dots of sensor data 620 represent LIDAR returns indicative of the surfaces of objects in vehicle's 100's environment generated by a LIDAR system, such as LIDAR system 330. As such, the lines 622, 624 represent the bounds of the field of view 332 of LIDAR system 330. In addition, the top-down view 610 provides context for the features, including traffic light 410 and vehicle 420, represented by the "LIDAR" data points (indicative of surfaces of objects) of the sensor data 620.

In the example 600 of FIG. 6, a group of points corresponding to the surfaces of vehicle 420 are fitted into a bounding box 630. Although depicted as 2D because of the perspective of sensor data 620, the bounding box 630 is actually a 3D volume. In addition, the perception system 172 may use the group of points within the bounding box as well as the changes to those points and/or the bounding box over time, in order to determine any of the aforementioned characteristics of the vehicle 420.

Figure 7:
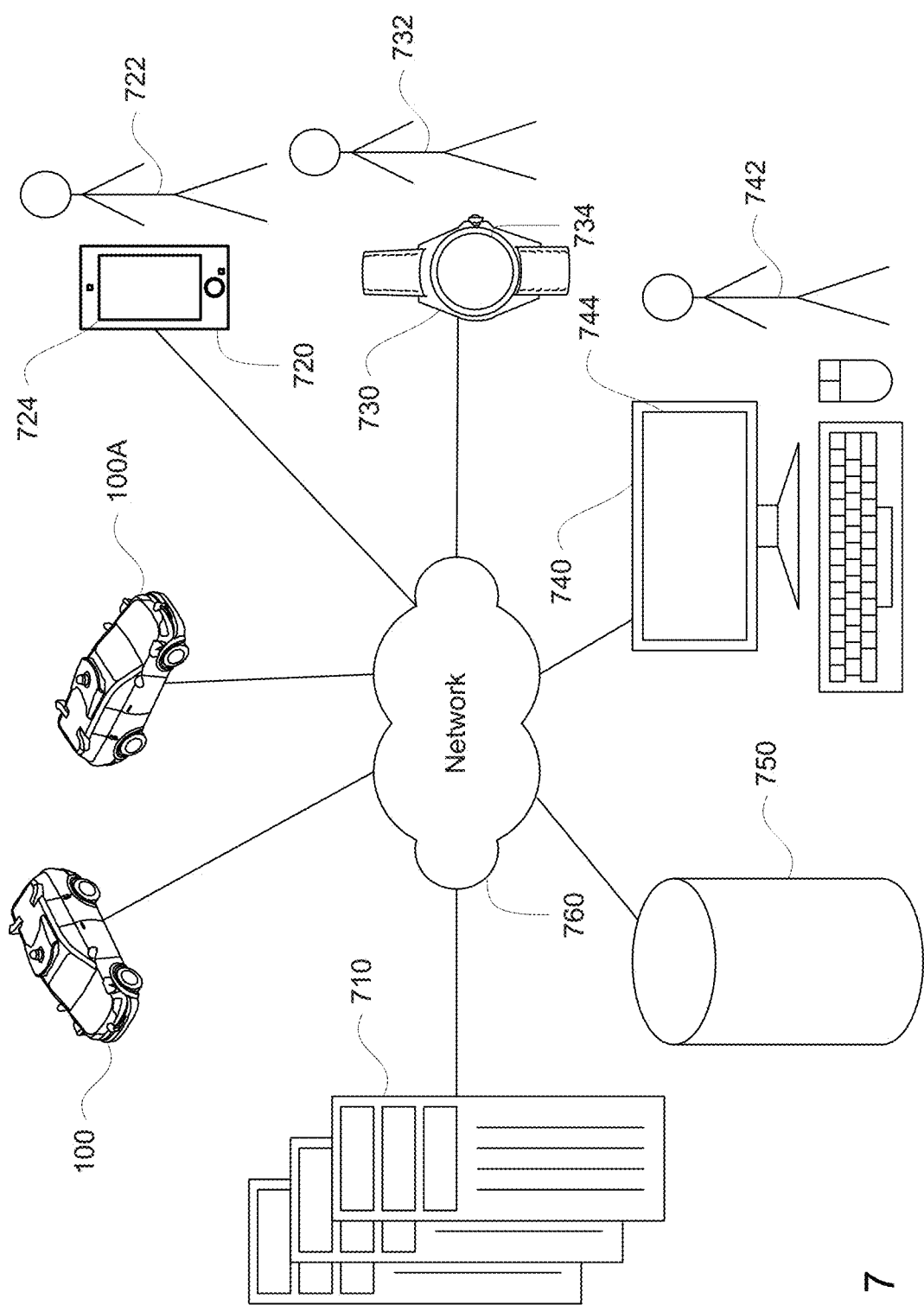
FIG. 7 is a pictorial diagram of an example system in accordance with aspects of the disclosure.
Figure 8:
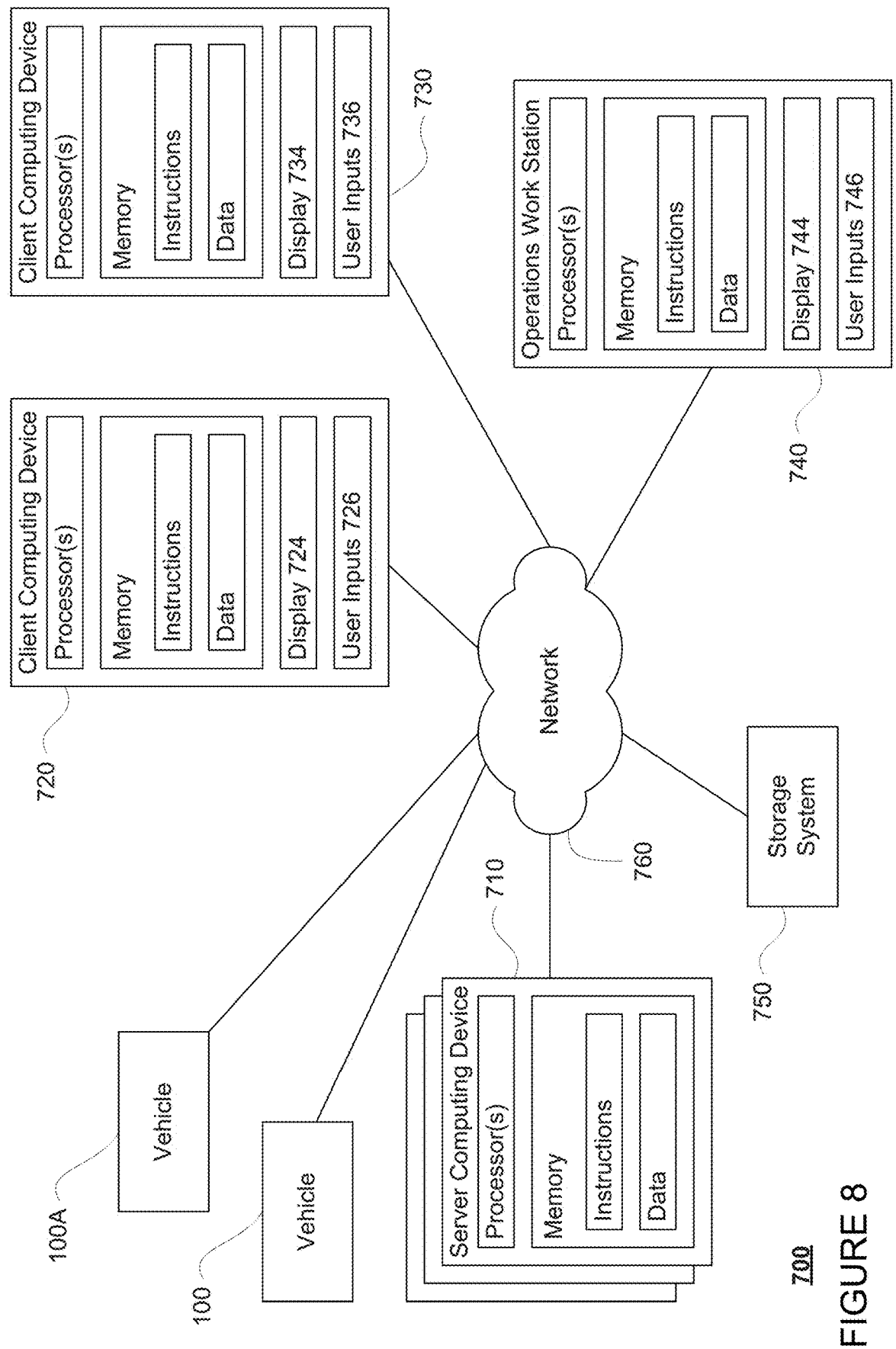
FIG. 8 is a functional diagram of the system of FIG. 7 in accordance with aspects of the disclosure.

Computing device 110 of vehicle 100 may also receive or transfer information to and from other computing devices, such as those computing devices that are a part of the transportation service as well as other computing devices. FIGS. 7 and 8 are pictorial and functional diagrams, respectively, of an example system 700 that includes a plurality of computing devices 710, 720, 730, 740 and a storage system 750 connected via a network 760. System 700 also includes vehicle 100, and vehicles 100A, 100B which may be configured the same as or similarly to vehicle 100. Although only a few vehicles and computing devices are depicted for simplicity, a typical system may include significantly more.

As shown in FIG. 7, each of computing devices 710, 720, 730, 740 may include one or more processors, memory, data and instructions. Such processors, memories, data and instructions may be configured similarly to one or more processors 120, memory 130, instructions 132, and data 134 of computing device 110.

The network 760, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 710 may include one or more server computing devices having a plurality of computing devices, e.g., a load balanced server farm, that exchange information with different nodes of a network for the purpose of receiving, processing and transmitting the data to and from other computing devices. For instance, one or more computing devices 710 may include one or more server computing devices that are capable of communicating with computing device 110 of vehicle 100 or a similar computing device of vehicle 100A as well as computing devices 720, 730, 740 via the network 760. For example, vehicles 100, 100A, may be a part of a fleet of vehicles that can be dispatched by server computing devices to various locations. In this regard, the server computing devices 710 may function as a validation computing system which can be used to validate autonomous control software which vehicles such as vehicle 100 and vehicle 100A may use to operate in an autonomous driving mode. In addition, server computing devices 710 may use network 760 to transmit and present information to a user, such as user 722, 732, 742 on a display, such as displays 724, 734, 744 of computing devices 720, 730, 740. In this regard, computing devices 720, 730, 740 may be considered client computing devices.

As shown in FIG. 7, each client computing device 720, 730, 740 may be a personal computing device intended for use by a user 722, 732, 742, and have all of the components normally used in connection with a personal computing device including a one or more processors (e.g., a central processing unit (CPU)), memory (e.g., RAM and internal hard drives) storing data and instructions, a display such as displays 724, 734, 744 (e.g., a monitor having a screen, a touch-screen, a projector, a television, or other device that is operable to display information), and user input devices 726, 736, 746 (e.g., a mouse, keyboard, touchscreen or microphone). The client computing devices may also include a camera for recording video streams, speakers, a network interface device, and all of the components used for connecting these elements to one another.

Although the client computing devices 720, 730, and 740 may each comprise a full-sized personal computing device, they may alternatively comprise mobile computing devices capable of wirelessly exchanging data with a server over a network such as the Internet. By way of example only, client computing device 720 may be a mobile phone or a device such as a wireless-enabled PDA, a tablet PC, a wearable computing device or system, or a netbook that is capable of obtaining information via the Internet or other networks. In another example, client computing device 730 may be a wearable computing system, shown as a wristwatch as shown in FIG. 7. As an example the user may input information using a small keyboard, a keypad, microphone, using visual signals with a camera, or a touch screen.

In some examples, client computing device 740 may be an operations workstation used by an administrator or other human operator, such as user 742, to respond to requests for assistance received from the computing devices of vehicles such as vehicle 100 and vehicle 100A. Although only a single operations workstation 740 is shown in FIGS. 7 and 8, any number of such work stations may be included in a typical system. Moreover, although operations work station is depicted as a desktop computer, operations works stations may include various types of personal computing devices such as laptops, netbooks, tablet computers, etc.

As with memory 130, storage system 750 can be of any type of computerized storage capable of storing information accessible by the server computing devices 710, such as a hard-drive, memory card, ROM, RAM, DVD, CD-ROM, write-capable, and read-only memories. In addition, storage system 750 may include a distributed storage system where data is stored on a plurality of different storage devices which may be physically located at the same or different geographic locations. Storage system 750 may be connected to the computing devices via the network 760 as shown in FIGS. 7 and 8, and/or may be directly connected to or incorporated into any of the computing devices 110, 710, 720, 730, 740, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, as vehicle 100 drives around, its perception system 172 may use the various sensors to detect and identify objects in the vehicle's environment. Again, at least some of these sensors may include the aforementioned cameras and LIDAR systems. To ensure that a given camera having an overlapping field of view with a LIDAR system of the vehicle, such as camera 310 or 320, is working properly, the functionality of the camera may be assessed.

For light emitting road users such as vehicles observed by the perception system during evening hours or where the amount of ambient light is low, each time or every so often that a vehicle is identified by the perception system, a camera having an overlapping field of view with the location of that vehicle at the same time as when the LIDAR sensor data was generated may be selected. If an image was captured using the identified camera at the same or similar time (within a fraction of a second or more or less), that image may be used to validate the functionality of the camera.

For instance, returning to the example of FIG. 6, the LIDAR system 330 may generate the sensor data 620. Using known techniques and based on the aforementioned characteristics, perception system 172 may identify the bounding box of a vehicle (here, bounding box 630 for vehicle 420) as well as its characteristics (such as location, shape, size, etc.) and provide this information to computing devices 110.

At this point, the computing devices 110 may select a camera, such as camera 310 or 320, having an overlapping field of view with the LIDAR system that generated the sensor data corresponding to the identified vehicle. As such, the camera that is selected may be the camera that is assessed. Once assessed, the computing devices 110 retrieve an image from the selected camera, such as image 400 or image 500, captured at the same or similar time from a camera.

The computing devices 110 may then identify an area of the image corresponding to the volume of space of the 3D bounding box. In order to do so, the 3D bounding box may be projected into the image. For instance, the bounding box 630 may be projected into image 400 or 500 based on the location, shape and/or size of the bounding box as well as the orientation of the camera that captured the image. As shown in example 900 of FIG. 9, the result of the projection may be a 2D polygon 910, which may or may not be a rectangle, which provides an approximate outline of the vehicle in the image, here vehicle 420 in image 400.

Assuming that the image was captured during evening or otherwise low ambient lighting conditions, the area of the image within the polygon 910 may then be processed in order to identify contrast areas indicative of bright objects, such as one or more vehicle lights. For instance, these vehicle lights may include turn signals, headlights, corner lights, brake lights, etc. In many cases, these lights, and in particular vehicle tail lights, headlights, and other vehicle lights, will have consistent characteristics between different vehicle, such as brightness, because such characteristics are specified by law.

Figure 10:
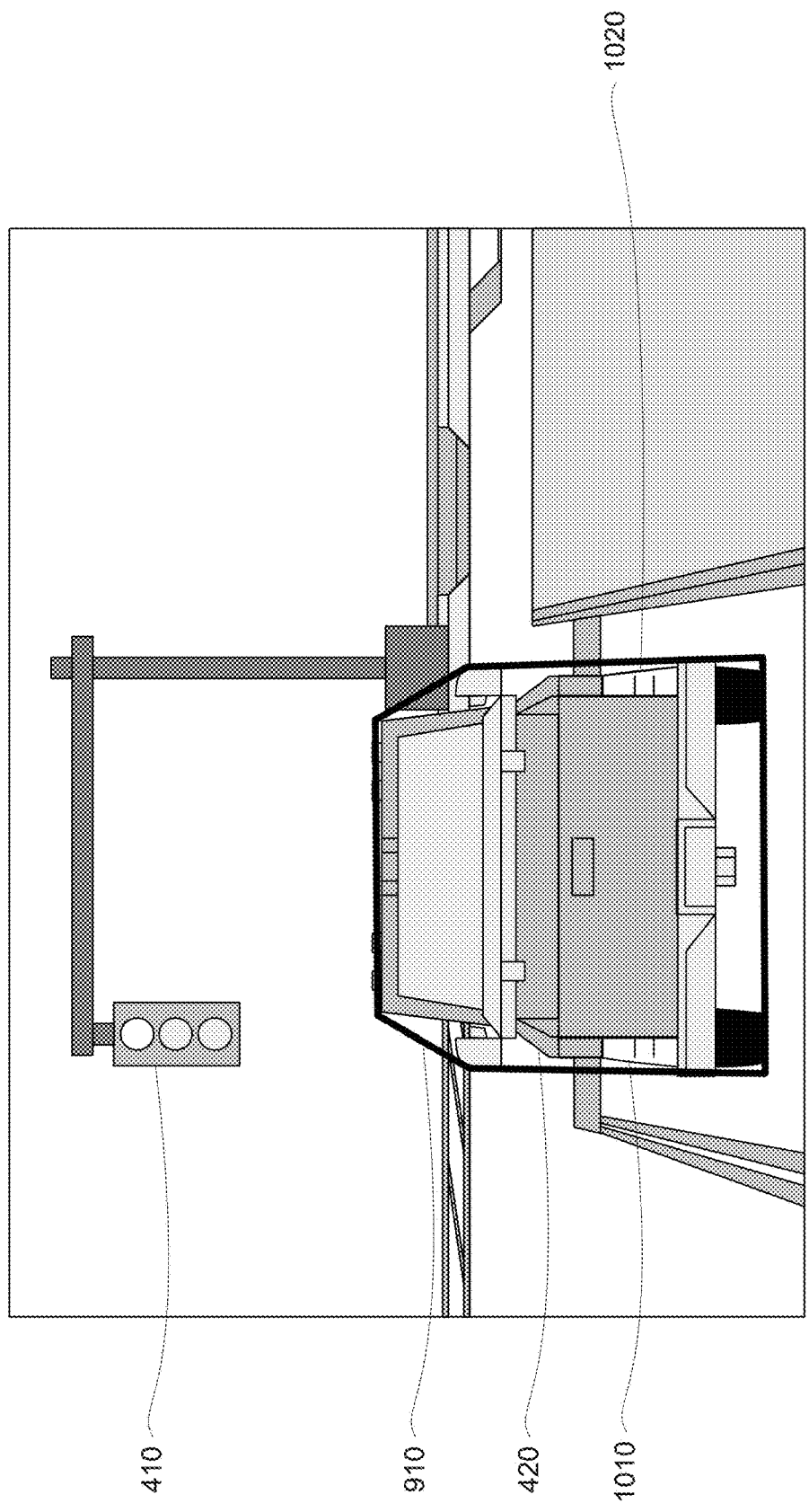
FIG. 10 is another example image and data in accordance with aspects of the disclosure.

The processing may be effected using an image classifier that identifies areas of local maximum brightness above some brightness threshold. In other words, bright objects may be identified because in a neighborhood or small area of pixels there is a high contrast in light (corresponding to a vehicle light) and dark pixels. For instance, as shown in example 1000 of FIG. 10, brake lights 1010 and 1020 may be identified. In the case of images captured at night, these bright areas are especially apparent relative to darker, unlit areas.

Figure 11:
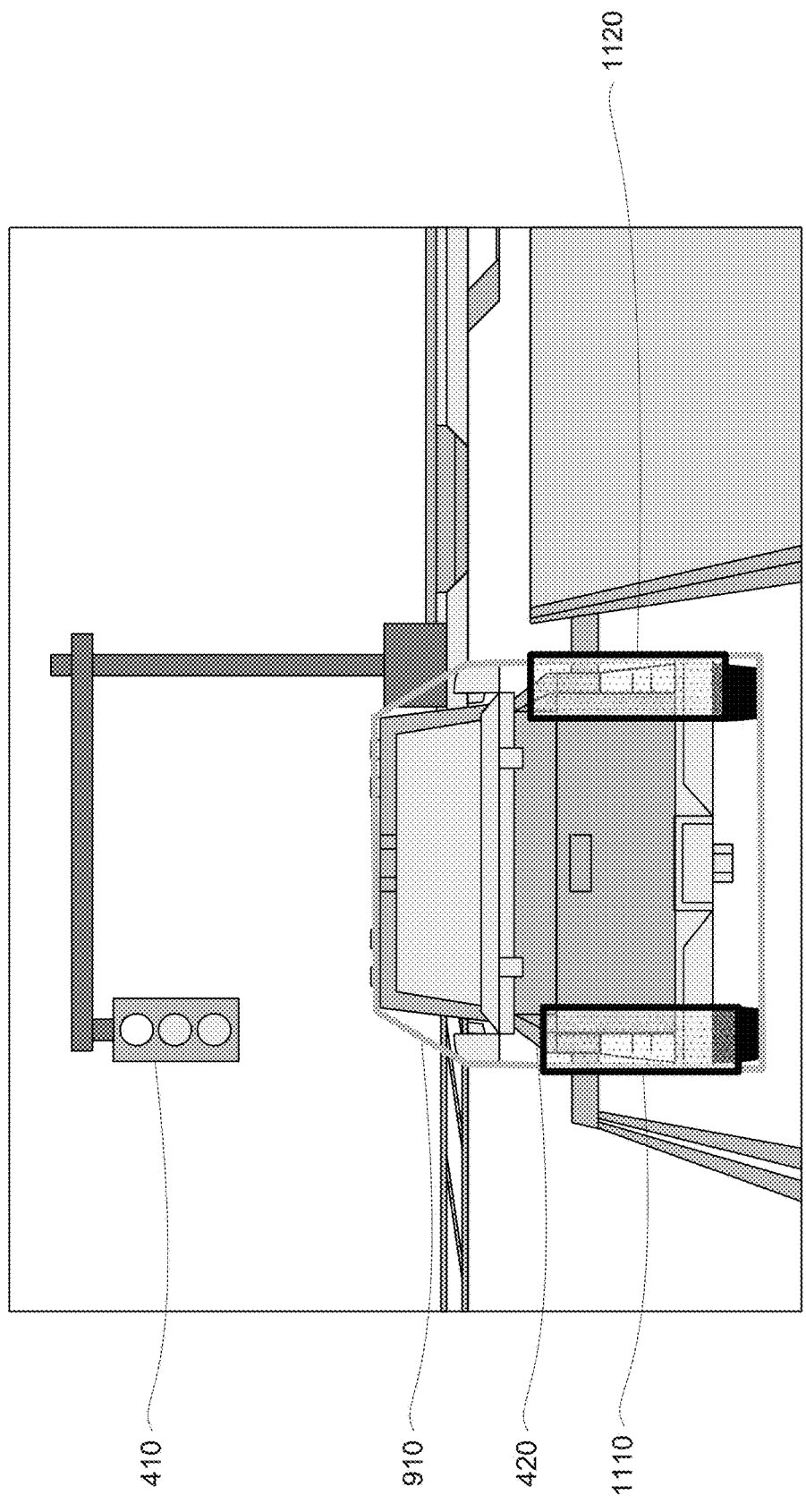
FIG. 11 is a further example image and data in accordance with aspects of the disclosure.

In some instances, rather than processing the entire area of the polygon, only certain areas of the polygon, such as expected areas where vehicle lights might be located, may be processed. For instance, only areas likely to correspond to vehicle lights may be processed, such as areas 1110 and 1120 of example 1100 of FIG. 11. This may be determined using a generic model for all vehicles or specific models for specific types of vehicles, assuming that the type of vehicle has been specified, for instance, by the perception system.

In addition, the size of the images may be reduced in order to simplify processing. For instance, images may be reduced in size, for instance by thumbnailing, and/or otherwise cropped to include only the portions corresponding to the overlapping field of view. This thumbnailing may actually provide for some tolerance in the differences between compared locations in the LIDAR sensor data and the thumbnailed image while also increasing computational speed.

The operation of the selected camera may then be assessed based on the aforementioned processing. If one or more vehicle lights are identified within a polygon of an image, the camera may be determined to be functioning normally. In addition, if there are a plurality of polygons, such of two or more or less, in a plurality of images, such as 2 or more or less, in which no vehicle lights are identified, this may be an indication that camera is not functioning properly. As such, an appropriate response may be taken. For instance, a cleaning system for the selected camera, such as cleaning system 314 or 324, may be automatically activated in order to attempt to clean the cameras. In some instances, a vehicle's computing system can avoid processing images from a malfunctioning camera.

In addition or alternatively, a request may be sent by the computing devices 110 to a remote assistance operator, such as to computing device 740 and user 742, for instance via network 760, to check the camera images (either original or reduced). The remote assistance operator or user 742 may be able to determine whether a simple cleaning (by activating a cleaning system such as a wiper and washer fluid) is sufficient to correct the problem, if the vehicle should pull over, or if the camera is not a critical sensor, whether the vehicle should simply stop using information from that camera to make driving decisions. In some instances, the remote assistance operator or user 742 may be able to activate (and in some cases also deactivate) one or more of the cleaning systems remotely and view a second set of images to confirm whether the cleaning was sufficient. The computing devices 110 may also send via network 760 updated images from each camera of the camera group in order to allow the remote assistance operator or user 742 to confirm that the problem has been addressed.

Figure 12:
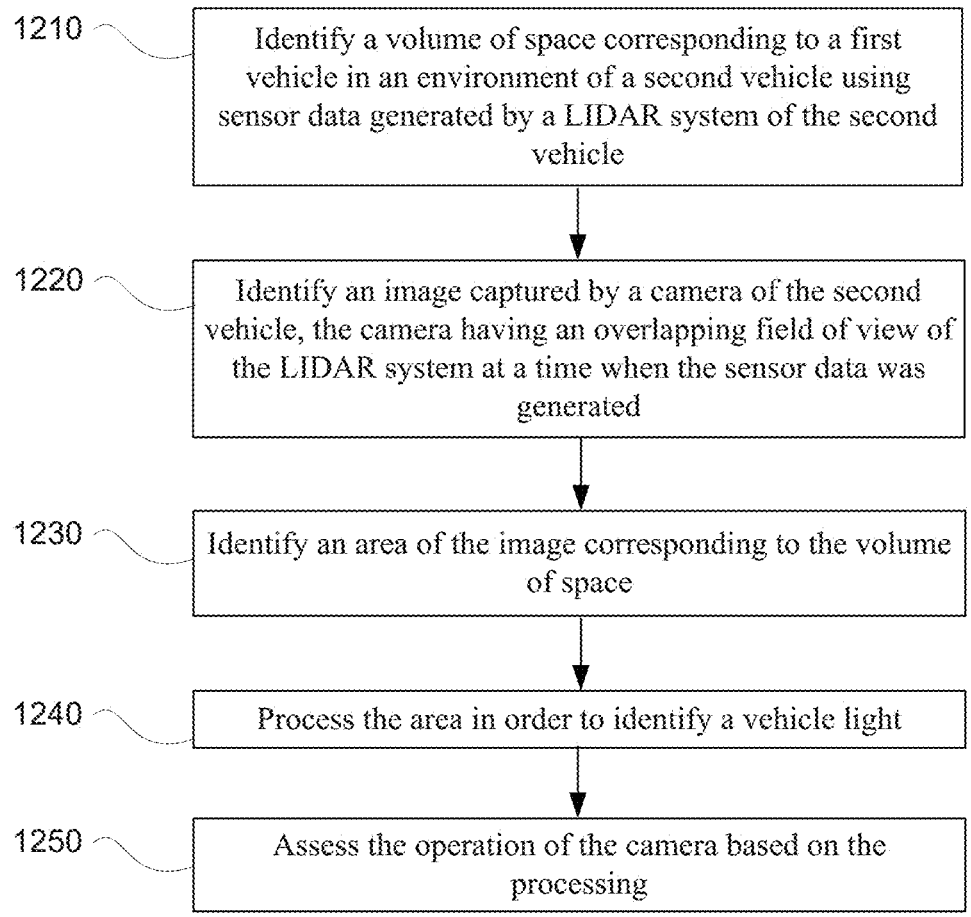
FIG. 12 is an example flow diagram in accordance with aspects of the disclosure.

FIG. 12 is an example flow diagram 1200 for assessing the operation a camera in accordance with some of the aspects described herein and that may be performed by one or more processors of one or more computing devices, such as processors 120 of computing devices 110. In this example, at block 1210, a volume of space corresponding to a first vehicle in an environment of a second vehicle is identified using sensor data generated by a LIDAR system of the second vehicle. At block 1220, an image captured by a camera of the second vehicle is identified. The camera has an overlapping field of view of the LIDAR system at the same time as when the sensor data was generated. At block 1230, an area of the image corresponding to the volume of space is identified. At block 1240, the area is processed in order to identify a vehicle light. At block 1250, the operation of the camera is assessed based on the processing.

As noted above, the aforementioned technique is especially useful in night and evening hours where there is little ambient light. However, when there is a lot of ambient light, such as during the day time or daylight hours, this technique may be less effective. As such, different techniques may be used to validate a camera based on the time of day and/or ambient lighting conditions when the sensor data was generated.

For instance, for images captured during daylight hours, an object and its background will likely have a "color edge" or a change in color at the edge of the object and the background. Similarly, images captured by a camera of the perception system may include two or more objects. When these two objects that are at least partially in line with the camera at different depths will have a color edge between them. As an example, two road users, such as vehicles at different distances, when seen in an image may have a sharp edge in color between them. In other words, typically an edge in depth will also have an edge in color. As such, the operation of a camera may be assessed each time the perception system 172 identifies an object, such as another road user, likely to have a distinct edge in color.

The perception system may provide the bounding box and other characteristics of the road user to the computing devices 110. Again, this bounding box may correspond to a volume of space corresponding to a road user in an environment of vehicle 100 generated from sensor data, such as sensor data 620 of FIG. 6, generated by a LIDAR system, such as LIDAR system 330. Again, using known techniques and based on the aforementioned characteristics, perception system 172 may identify the bounding box of a road user such as a vehicle (here, bounding box 630 for vehicle 420) as well as its characteristics (such as location, shape, size, etc.) and provide this information to computing devices 110.

At this point, the computing devices 110 may select a camera, such as camera 310 or 320, having an overlapping field of view with the LIDAR system that generated the sensor data corresponding to the identified vehicle. As such, the camera that is selected may be the camera that is assessed. Once assessed, the computing devices 110 retrieve an image from the selected camera, such as image 400 or image 500, captured at the same or similar time from a camera.

As another example, when the perception system identifies two objects several meters, such as 2 or more or less, apart from LIDAR sensor data, a camera having an overlapping field of view with the location of that vehicle at the same time as when that the LIDAR sensor data was generated may be selected. If an image was captured using the identified camera at the same or similar time (within a fraction of a second or more or less) and the objects appear to at least partially overlap (i.e. one object partially occludes the other) with respect to a line of sight of the camera, that image may be used to validate the functionality of the camera.

Figure 9:
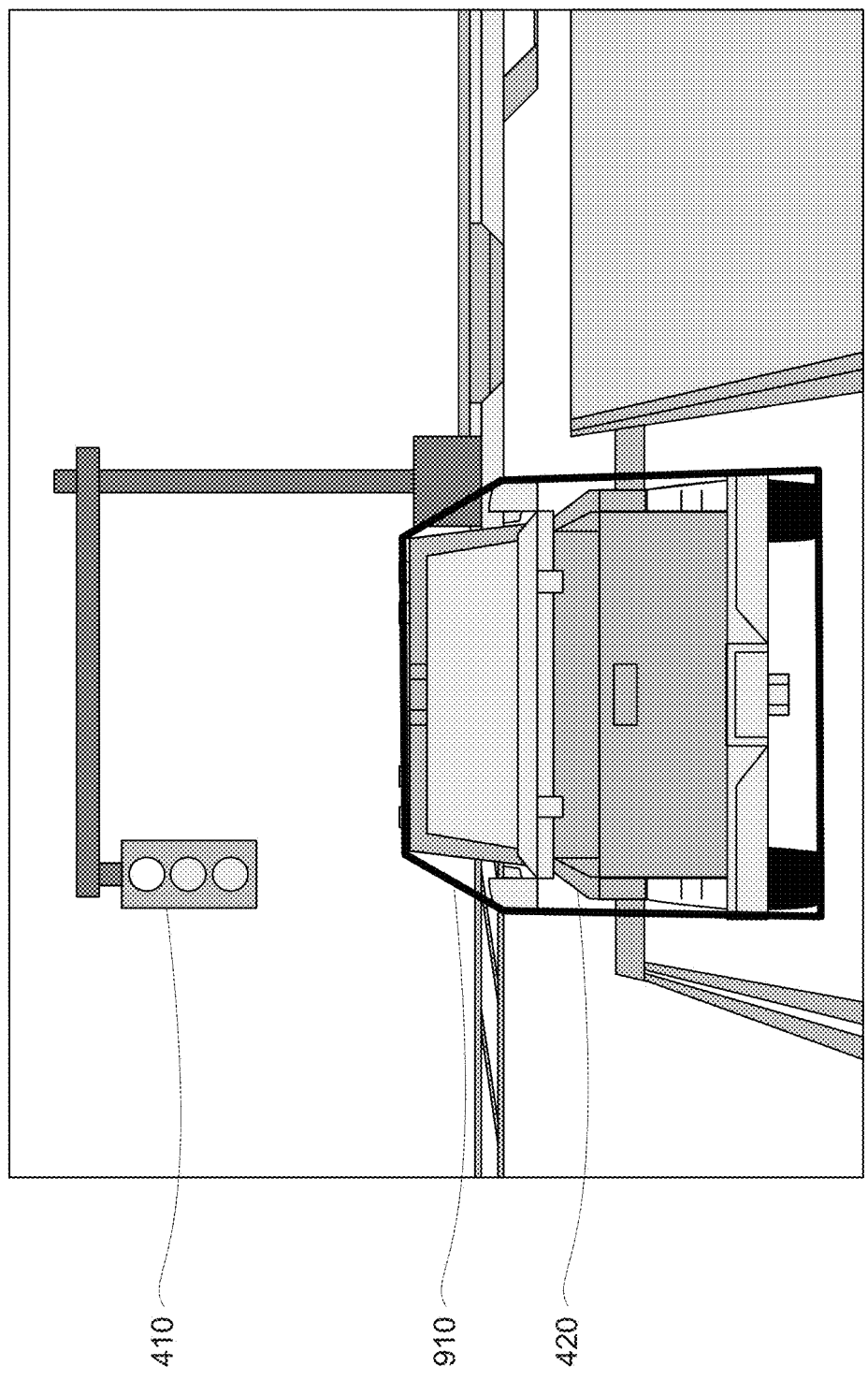
FIG. 9 is an example image and data in accordance with aspects of the disclosure.

The computing devices 110 may then identify an area of the image corresponding to the volume of space of the 3D bounding box. In order to do so, the 3D bounding box may be projected into the image. For instance, the bounding box 640 may be projected into image 400 or 500 based on the location, shape and/or size of the bounding box as well as the orientation of the camera that captured the image. As shown in FIG. 9, the result of the projection may be a 2D polygon 910, which may or may not be a rectangle, which provides an approximate outline of the vehicle in the image, here vehicle 420 in image 400. Because the objects appear to at least partially overlap in the image, at least one of the intersections of these polygons may represent a difference in depth.

Again, the size of the image may be reduced in order to simplify processing. For instance, images may be reduced in size, for instance by thumbnailing, and/or otherwise cropped to include only the portions corresponding to the overlapping field of view. This thumbnailing may actually provide for some tolerance in the differences between compared locations in the lidar sensor data and the thumbnailed image while also increasing computational speed.

Figure 13:
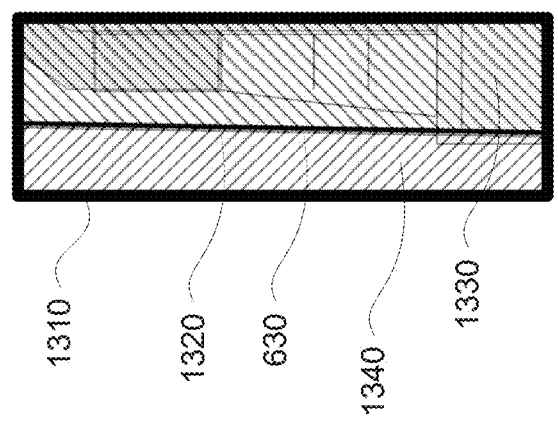
FIG. 13 is another example portion of an image and data in accordance with aspects of the disclosure.

The area may be used to determine whether there is an edge in color in the image at the road user or rather whether there is a difference in color. For instance, areas around the edge of the 2D polygon 910 may be used to determine an amount of contrast between pixels immediately adjacent to an edge and on different sides of the edge. Example 1300 of FIG. 13 represents an example area 1310 around the bounding box 630 that may be processed to identify the differences in color along an edge 1320 of the bounding box 630 projected in image 400. Although only a small portion of the edge is shown, areas along the entire edge of the bounding box may be processed.

For instance, pixels in a small neighborhood on both sides the edge, such as in areas within ten pixels on either side (represented by shaded side 1330 and shaded side 1340) of the edge 1320, may be processed to identify actual or average differences in color between the two groups of pixels. The color difference is expressed in units of color difference such as delta-E (CIE76). In other words, the color difference may be expressed as the Euclidean distance between two vectors in the Lab color space. A threshold may then be used to determine if the two colors are sufficiently different.

The operation of the selected camera may then be assessed based on the aforementioned determination. If the threshold is met, this may be an indication that the camera is functioning normally. However, if there are a plurality of polygons, such of two or more or less, in a plurality of images, such as 2 or more or less, in which no color differences are identified (i.e. the threshold is not met), this may be an indication that camera is not functioning properly. As such, an appropriate response may be taken such as those discussed above.

Figure 14:
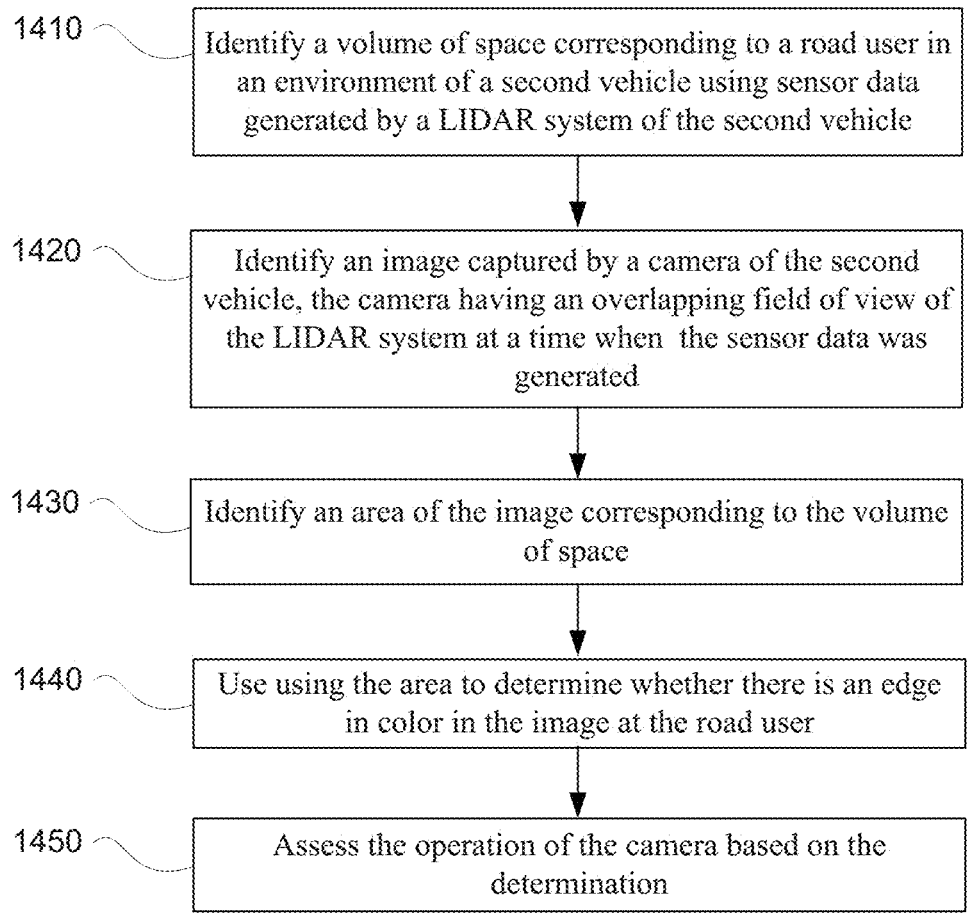
FIG. 14 is another example flow diagram in accordance with aspects of the disclosure.

FIG. 14 is an example flow diagram 1400 for assessing the operation a camera in accordance with some of the aspects described herein and that may be performed by one or more processors of one or more computing devices, such as processors 120 of computing devices 110. In this example, at block 1410, a volume of space corresponding to a road user in an environment of a second vehicle is identified using sensor data generated by a LIDAR system of the second vehicle. At block 1420, an image captured by a camera of the second vehicle is identified. The camera has an overlapping field of view of the LIDAR system at the same time as when he sensor data was generated. At block 1430, an area of the image corresponding to the volume of space is identified. At block 1440, the area is used to determine whether there is an edge in color in the image at the road user. At block 1450, the operation of the camera is assessed based on the determination.

The features described herein allow for reliable camera assessment during various lighting conditions. As noted above, it is incredibly challenging to determine whether a camera is "seeing" the world properly or if it is malfunctioning. This can be especially important in the case of autonomous vehicles which rely upon such cameras to make driving decisions, and also to alert remote assistance when there might be problem, to decide how and when to operate cleaning systems, and to detect when the cleaning system was insufficient.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for assessing operation of a camera, the method comprising:

identifying, by one or more processors, a volume of space corresponding to a first vehicle in an environment of a second vehicle using sensor data generated by a light detection and ranging (LIDAR) system of the second vehicle;

identifying, by the one or more processors, an image captured by a camera of the second vehicle, the camera having a field of view that overlaps with a portion of a field of view of the LIDAR system at a time when the sensor data was generated;

projecting, by the one or more processors, a three-dimensional (3D) bounding box into the image in order to identify an area of the image corresponding to the volume of space;

determining, by the one or more processors based on the identified area of the image, a result indicating whether there is a difference in color of an edge of the 3D bounding box projected into the image that meets a color difference threshold, wherein groups of pixels on each side of the edge are processed to identify actual or average differences in color between the groups of pixels on each side of the edge; and assessing, by the one or more processors, the operation of the camera based on the result.

2. The method of claim 1, wherein the 3D bounding box corresponds to the volume of space, and the area is a two-dimensional (2D) polygon.

3. The method of claim 2, wherein the 3D bounding box is projected into the image in order to identify the 2D polygon.

4. The method of claim 2, wherein the polygon is not a rectangle.

5. The method of claim 1, wherein the camera includes a neutral density (ND) filter.

6. The method of claim 1, wherein the image includes a vehicle tail light.

7. The method of claim 1, further comprising:

processing, by the one or more processors, one or more sub-areas within the area in order to identify a vehicle light based on a model of a vehicle selected from a plurality of models, wherein the selection of the model is based on a type of the vehicle, the model indicating expected areas of vehicle lights, wherein the processing the one or more sub-areas within the area includes using an image classifier in order to identify one or more areas of local maximum brightness above a brightness threshold.

8. The method of claim 1, further comprising:

processing, by the one or more processors, one or more sub-areas within the area in order to identify a vehicle light based on a model of a vehicle selected from a plurality of models, wherein the selection of the model is based on a type of the vehicle, the model indicating expected areas of vehicle lights, wherein the processing the one or more sub-areas within the area includes identifying contrast areas indicative of bright objects in the area.

9. The method of claim 1, wherein the identifying the image is further based on ambient lighting conditions when the sensor data was generated.

10. The method of claim 1, wherein the identifying the image is further based on a time of day when the sensor data was generated.

11. The method of claim 1, further comprising, based on the assessment, attempting to clean a lens of the camera.

12. The method of claim 1, wherein the second vehicle is at least one of a car, a truck, a motorcycle, a bus or a recreational vehicle.

13. The method of claim 1, further comprising:
reducing, by the one or more processors, a size of the image to include only portions of the image corresponding to the overlapping field of view of the camera, wherein the size of the image is reduced by performing at least one of thumbnailing or cropping.

14. A computing device for assessing operation of a camera, the computing device comprising:
a memory configured to store instructions and data;
one or more processors coupled to the memory, the one or more processors configured to:
access the instructions and data stored in the memory;
identify a volume of space corresponding to a first vehicle in an environment of a second vehicle using sensor data generated by a light detection and ranging (LIDAR) system of the second vehicle;
identify an image captured by a camera of the second vehicle, the camera having a field of view that overlaps with a portion of a field of view of the LIDAR system at a time when the sensor data was generated;
project a three-dimensional (3D) bounding box into the image in order to identify an area of the image corresponding to the volume of space;
determine, based on the identified area of the image, a result indicating whether there is a difference in color of an edge of the 3D bounding box projected into the image that meets a color difference threshold, wherein groups of pixels on each side of the edge are processed to identify actual or average differences in color between the groups of pixels on each side of the edge; and
assess the operation of the camera based on the result.

15. The computing device of claim 14, wherein the computing device is comprised by the second vehicle.

* * * * *